May 30, 1933. F. H. OWENS 1,912,156
OPTICAL SYSTEM
Filed May 5, 1926

INVENTOR
Freeman H. Owens,
BY
John B. Brady
ATTORNEY

Patented May 30, 1933

1,912,156

UNITED STATES PATENT OFFICE

FREEMAN H. OWENS, OF NEW YORK, N. Y.

OPTICAL SYSTEM

Application filed May 5, 1926. Serial No. 106,846.

My invention relates broadly to optics, and more particularly to apparatus for facilitating the recording and reproduction of sound photographically.

One of the objects of my invention is to provide a construction of optical slit through which light may be projected in varying values for recording sound waves upon a film and for reproducing a sound record from a film.

Another object of my invention is to provide an apparatus for the photographic recording and reproduction of sound whereby a light concentrating device for directing light upon a film is maintained at all times free and clear of dirt and foreign matter for the passage of light without obstruction to or from the photographic film.

Still another object of my invention is to provide a combined lens and optical slit for use in the recording and reproduction of sound photographically where a light beam of predetermined cross section may be directed upon a sensitized film.

In machines for recording and reproducing sound photographically upon film, the sound record is normally made by a beam of light directed through a slit. Heretofore in the art these slits have been formed by a pair of abutting plates, one of the plates having the slit cut in the edge thereof the set of plates being positioned adjacent the film. In practice, the rapidly moving film tends to deposit dust and foreign matter in the open slit, obstructing the passage of light through the slit, and correspondingly reducing the amount of light which falls upon the photo-electric cell of the sound reproducing system. This results in the reduction of volume of the reproduced sound. It has been suggested to use a pump for continuously blowing away the dust which tends to accumulate in the open slit, but this introduces undesirable mechanical complications.

Figure 1:
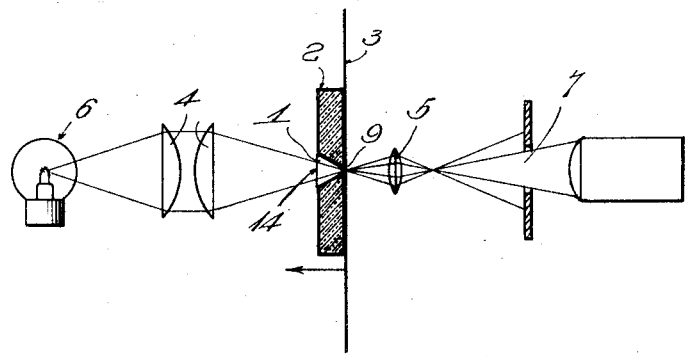
Figure 2:
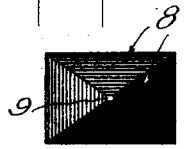
Figure 3:
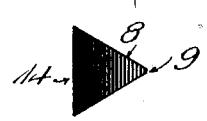
Figures 4, 5:
Figure 6:
Figure 7:
Figures 8, 9:
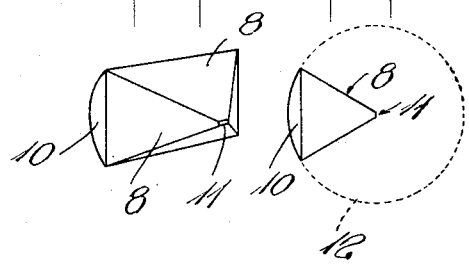
Figure 10:
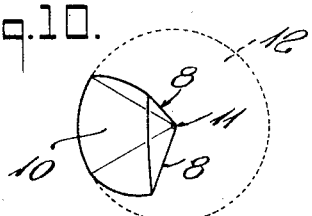

By my invention I provide an optical slit which at all times maintains a clear light concentrating path in which dirt cannot accumulate. The optical slit of my invention will be more clearly understood from the specification hereinafter following by reference to the accompanying drawing, in which:

Figure 1 illustrates an optical system showing a moving film and a light concentrated member constructed in accordance with my invention and supported adjacent the moving film; Fig. 2 is a front view of a rectangular pyramid construction of optical slit constructed in accordance with my invention; Fig. 3 is a side elevation of the optical slit illustrated in Fig. 2; Fig. 4 shows a front view of an optical slit of square pyramid construction; Fig. 5 is a side view of the optical slit illustrated in Fig. 4; Fig. 6 is a front view of a conical shaped optical slit; Fig. 7 is a side elevation thereof; Fig. 8 is a perspective view of a combined lens and pyramid optical slit construction; Fig. 9 illustrates one manner of cutting and grinding an optical slit in accordance with my invention; and Fig. 10 is a perspective view showing the method of forming a combined lens and square pyramid construction of optical slit.

Referring to the drawing in more detail, reference character 1 indicates the light concentrating member of my invention. The light concentrating member 1 is supported in a supporting member 2 having its surface opaque to the passage of light rays and arranged adjacent a light sensitive element or film 3. The light concentrating member is arranged in any desired optical system where light is concentrated into a beam, which I have represented as comprising the elements 4, 5, 6, and 7. The light concentrating device may be constructed in a variety of shapes and sizes, as I have illustrated in the several figures of the drawing.

In Fig. 2 a rectangular pyramid has been illustrated having the sides thereof covered by material opaque to light, as represented at 8. The sides of the pyramid are secured in supporting member 2 by any suitable means, such as cement. The rear wall 14 and the front 9 of the light concentrating device 1 are clear and transparent to the passage of light. The optical slit is ground at 9 to any suitable size and shape. In Figs. 2 and 3 this optical slit is substantially rectangular, while in Figs. 4 and 5 the optical slit is substantially square. Similarly, in Figs. 6 and 7, the optical slit 9 is substantially circular by virtue of the shape of the light concentrating device in each case.

In Fig. 8 I have shown a light concentrating device of rectangular pyramid shape having a lens face 10 thereon at one end and an optical slit 11 at the other end. This form of light concentrating device may be constructed from optical glass represented at 12 in Fig. 9.

In Fig. 10 a lens surface 10 is shown formed on a square pyramid base light concentrating member with an optical slit 11 ground on the smaller end thereof.

By the employment of my invention the optical slit is maintained clear at all times and no dirt can accumulate in it. There is no tendency for light to be reduced in intensity for no obstruction whatever is offered to the passage of light upon the film, but on the other hand, the optical slit affords means for increasing the intensity of the light. A concentrated beam of light is focused upon the light concentrating device which may be centrally mounted in the opaque supporting body 2 for direction upon the removing film 3.

It will be understood that the optical slit of my invention may be constructed in various forms and that no limitations upon my invention are intended other than are imposed by the scope of the appended claims.

What I claim as new and desire to secure by Letters Patent of the United States is as follows:

1. In an optical system the combination of a source of light, means for concentrating the light rays from said source in a beam, a supporting member having the surface thereof opaque to the passage of light rays, a light concentrating member having its front and rear transparent to the passage of light rays and its side walls opaque to the passage of light rays, the front of said light concentrating member having a convex surface and the rear of said light concentrating member terminating in a plane coincident with one side of said supporting member and arranged adjacent a light sensitive element, said light concentrating member being secured within said supporting member for concentrating the passage of light to said light sensitive element.

2. In a light directing system a transparent solid having a relatively small transparent area on one side and a relatively large transparent area on the opposite side, said relatively large transparent area having a convex surface, said transparent solid being mounted in an opaque holder extending in a plane perpendicular to the axis of said solid for a substantial distance on either side thereof confining the transmission of light through said transparent solid to said relatively small transparent area.

3. In a light directing system a transparent solid having a relatively small transparent area directed toward a light sensitive element and a relatively large transparent area on the opposite side of said transparent solid upon which light rays are directed, said relatively large transparent area having a convex surface, said transparent solid mounted in an opaque holder extending in a plane perpendicular to the axis of said solid on opposite sides thereof to restrict said light rays to said transparent areas.

4. The method of making a narrow light aperture by means of a transparent member which comprises forming an edge at one side of the member, and cutting away the edge to form a narrow face of the width of the aperture desired.

5. The method of making a narrow light aperture by means of a transparent member which comprises forming an edge at one side of the member, cutting away the edge to form a narrow face of the width of the aperture desired and covering the surface of the member to cause the light traversing it to be limited to a beam of the width of the narrow face.

6. In combination, means for guiding a moving film, and means for admitting a narrow beam of light thereto comprising a transparent member having a wedge-shaped portion arranged adjacent the film and terminating in a narrow face.

7. In combination, means for guiding a moving film, means for admitting a narrow beam of light thereto comprising a transparent member having a wedge-shaped portion arranged adjacent the film and terminating in a narrow face, and means for obstructing the passage of light through the side faces of the wedge-shaped portion.

8. In combination, a roller adapted to support a moving film and means for admitting a narrow beam of light to the film comprising a prism of transparent material, the portion of the prism adjacent the film being wedge-shaped and terminating in a narrow plane face and an opaque covering for the sides of the wedge-shape portion.

9. In combination, a roller having a transparent portion adapted to support and guide a moving film, a photo-electric device within the roller, a source of light, and means arranged between the source and the film for permitting a narrow beam only to pass through the film to the device, comprising a prism of transparent material having a wedge-shaped edge arranged adjacent to and transversely of the film and terminating in a narrow face, a holder for the prism engaging opposite sides thereof and an opaque covering on the sides of the wedge-shaped edge.

10. An aperture forming device comprising a transparent prism having a pair of inclined faces forming a wedge-shaped portion and a narrow flat face connecting said inclined faces.

11. A aperture forming device comprising a transparent prism, having a pair of inclined faces forming a wedge-shaped portion, a narrow flat face connecting said inclined faces, and an opaque covering on said inclined faces.

In testimony whereof I affix my signature.

FREEMAN H. OWENS.